United States Patent
Egloff

(10) Patent No.: US 6,918,597 B2
(45) Date of Patent: Jul. 19, 2005

(54) GASKET

(75) Inventor: Georg Egloff, Weibenhorn (DE)

(73) Assignee: Reinz-Dichtungs-GmbH & Co. KG., Neu-Ulm (DE)

( * ) Notice: Subject to any disclaimer, the term of this patent is extended or adjusted under 35 U.S.C. 154(b) by 214 days.

(21) Appl. No.: 09/880,769

(22) Filed: Jun. 15, 2001

(65) Prior Publication Data

US 2001/0052674 A1 Dec. 20, 2001

(30) Foreign Application Priority Data

Jun. 15, 2000 (DE) .......................................... 100 29 352

(51) Int. Cl.⁷ .............................................. F02F 11/00
(52) U.S. Cl. ........................ 277/594; 277/598; 277/922
(58) Field of Search ............................ 277/593–5, 598, 277/611, 639, 922

(56) References Cited

U.S. PATENT DOCUMENTS

| 4,728,110 | A | * | 3/1988 | Nakasone ................... 277/595 |
| 4,759,585 | A | | 7/1988 | Udagawa |
| 4,850,214 | A | * | 7/1989 | Opprecht et al. .......... 72/379.2 |
| 4,869,516 | A | * | 9/1989 | Udagawa et al. ........... 277/595 |
| 5,385,354 | A | * | 1/1995 | Hagiwara et al. ........... 277/594 |
| 5,427,388 | A | * | 6/1995 | Ueta ......................... 277/595 |
| 5,431,418 | A | * | 7/1995 | Hagiwara et al. ........... 277/592 |
| 5,473,133 | A | * | 12/1995 | Peterson ...................... 219/93 |
| 5,544,899 | A | * | 8/1996 | Ueta ........................... 277/595 |
| 5,628,518 | A | * | 5/1997 | Ushio et al. ................ 277/593 |
| 5,639,101 | A | * | 6/1997 | Tanaka et al. .............. 277/593 |
| 5,690,342 | A | * | 11/1997 | Tanaka et al. .............. 277/594 |
| 5,755,447 | A | * | 5/1998 | Hagiwara et al. ........... 277/601 |
| 6,027,124 | A | * | 2/2000 | Ishida et al. ................ 277/595 |
| 6,053,503 | A | * | 4/2000 | Buck et al. ................. 277/592 |
| 6,164,661 | A | * | 12/2000 | Kakuta et al. .............. 277/591 |
| 6,506,998 | B2 | * | 1/2003 | VanOtteren et al. ........ 219/118 |

FOREIGN PATENT DOCUMENTS

| DE | 37 41 344 A-1 | 6/1989 |
| DE | 38 20 796 C-2 | 6/1989 |
| DE | 19536718 A1 | 2/1997 |
| DE | 19548236 | 6/1997 |
| DE | 195 48 236 A-1 | 7/1997 |
| DE | 19829058 A1 | 1/2000 |

* cited by examiner

*Primary Examiner*—Alison K. Pickard
(74) *Attorney, Agent, or Firm*—Rader, Fishman & Grauer PLLC

(57) ABSTRACT

The invention refers to a gasket (1), the gasket having at least one metal layer (3) and at least one metal ring (5) welded thereto, the metal layer (3) having at least one through-hole (4) and the metal ring (5) being arranged around the through-hole, (4). The metal layer (3) and the metal ring (5) are welded to each other along a welding bead (7) which keeps the metal layer (3) and the metal ring (5) in a spaced apart relationship to one another. The gasket (1) has welding joints which are stable for a long time, and thus a high sealing capacity.

22 Claims, 9 Drawing Sheets

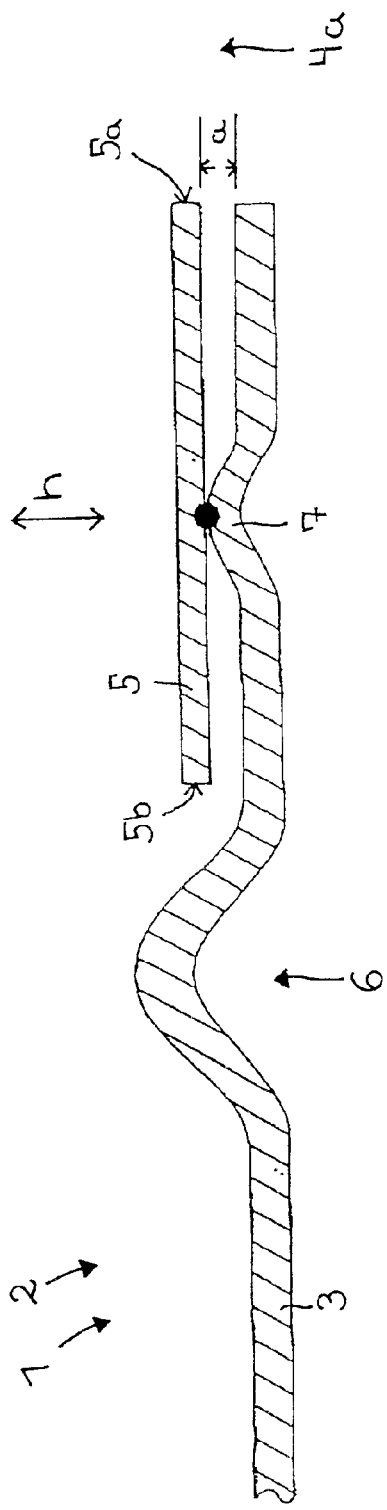
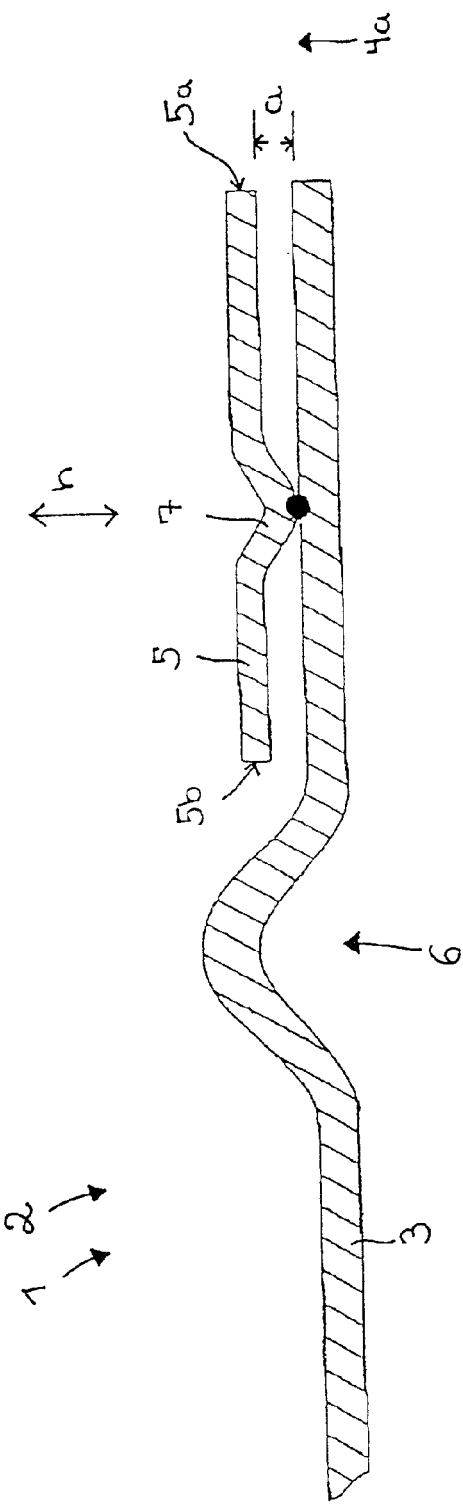

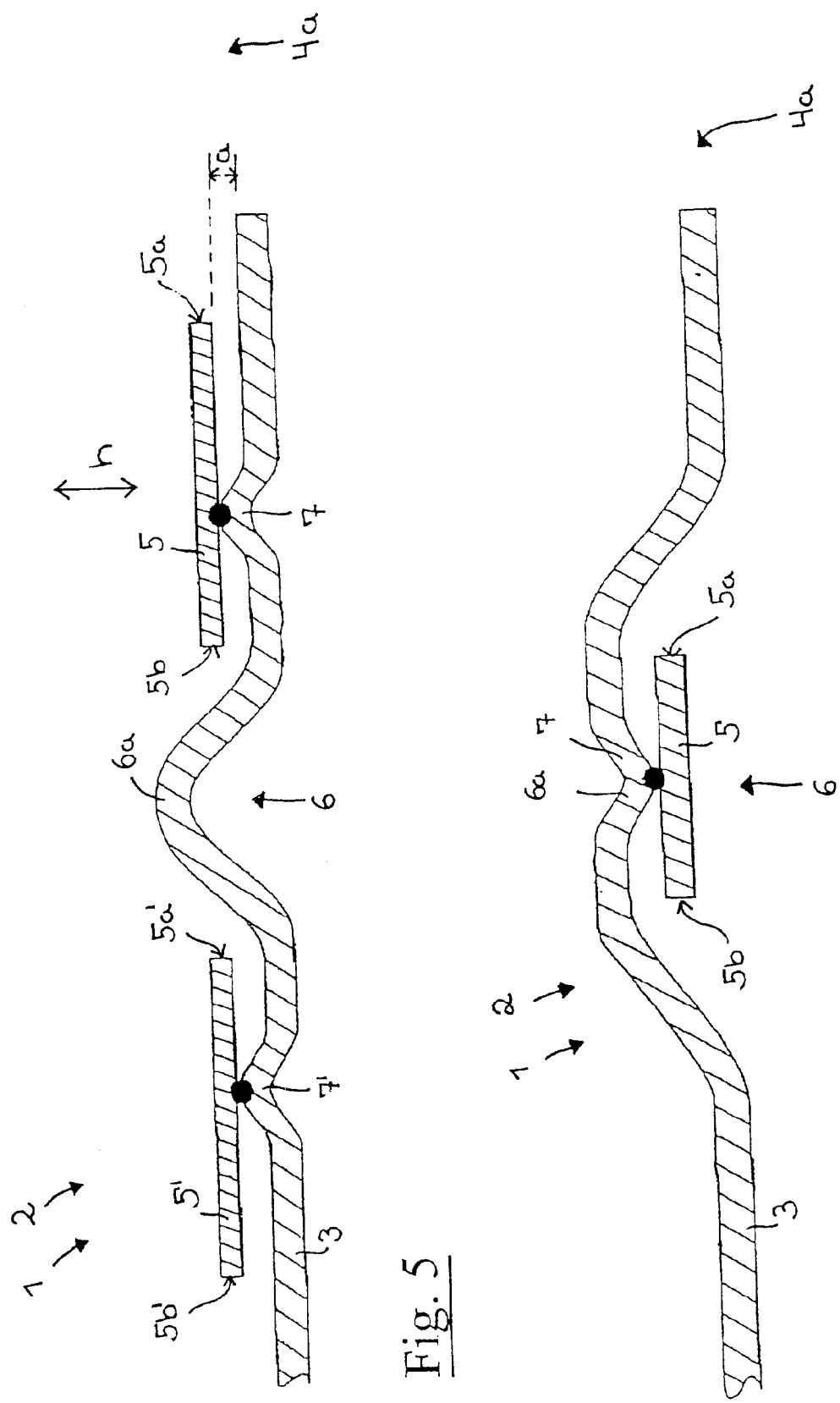

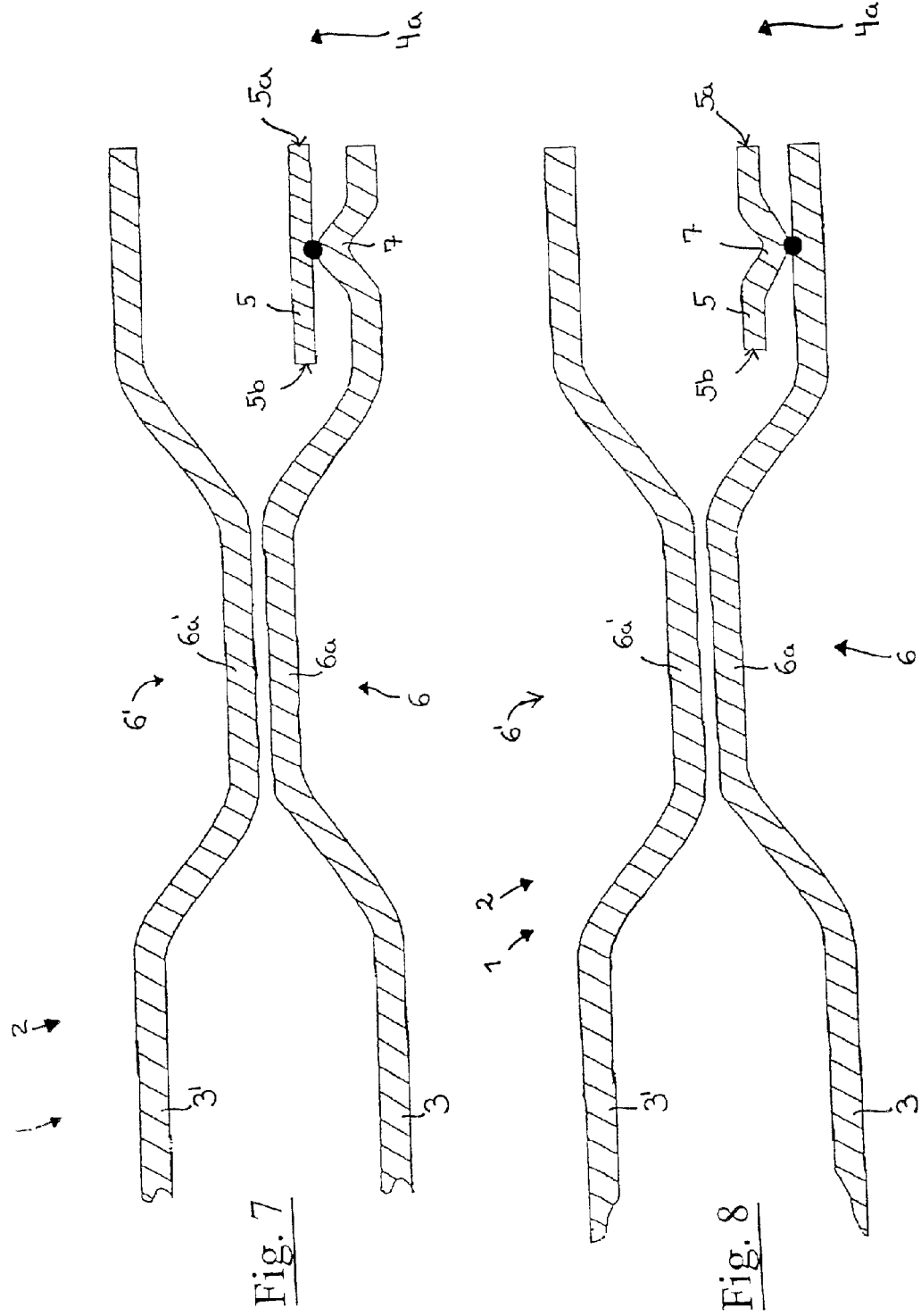

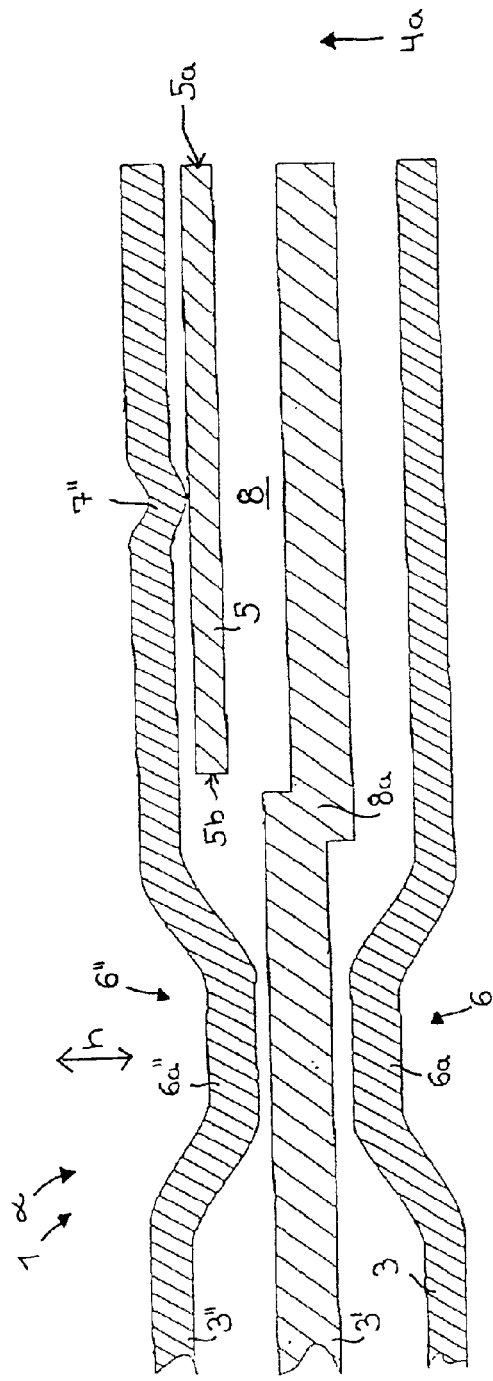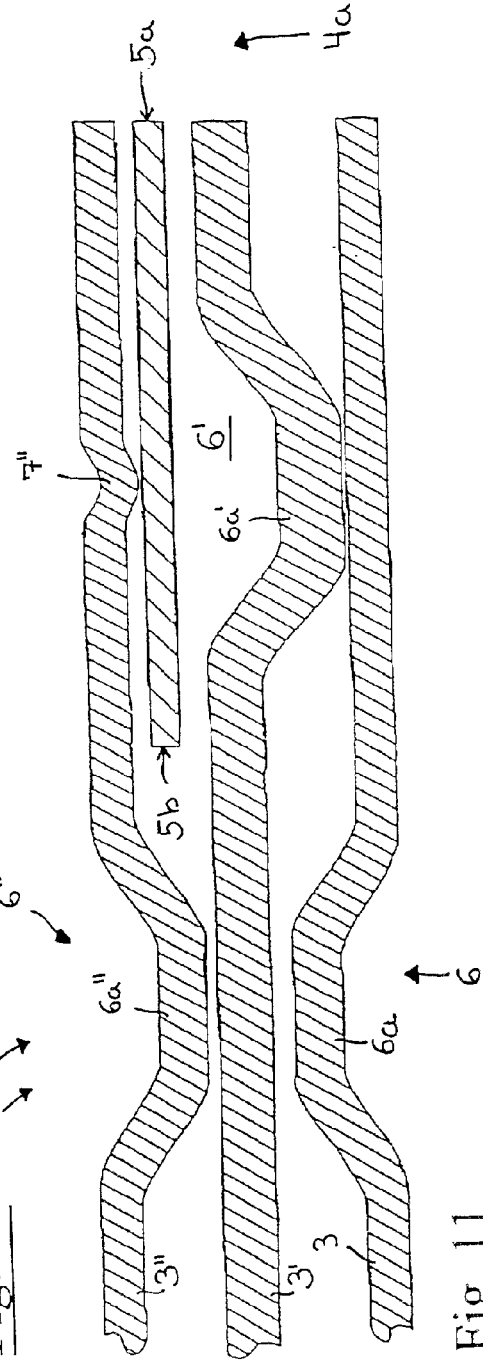
Fig. 10                    Fig. 11

GASKET

RELATED APPLICATION

The subject matter of this application is related to application Ser. No. 09/848,206 filed May 4, 2001, in the name of Kurt HOHE et al., entitled "Gasket and Method for the Manufacture Thereof".

FIELD OF THE INVENTION

The invention relates to gaskets, particularly but not exclusively gaskets of a type having at least one metal layer and at least one metal ring welded thereto, the metal layer having at least one through-hole and the metal ring being arranged around the through-hole. The invention also relates to a method for manufacturing gaskets.

BACKGROUND OF THE INVENTION

Nowadays, gaskets are used in many technical fields. One of those fields comprises internal combustion engines where the gaskets are used as cylinder head gaskets. In this case, the gaskets are arranged between the cylinder head and the cylinder block of the internal combustion engine. Combustion chambers, coolant and lubricant passageways and passageways for attaching means which keep together the cylinder head, the gasket and the cylinder block, are assigned to the through-holes. It is in particular the metal ring which is the reason for the sealing capacity of the gasket. When the attaching means are mounted or when the internal combustion engine is operated, the metal ring acts against an external force acting on the gasket. One further technical field where gaskets of the type referred to here are used, comprise for example exhaust gas modules in automotive vehicles where the gaskets are mainly used as exhaust gaskets.

The metal ring can be attached to the metal layer using several methods. One of these methods comprises welding the metal ring to the metal layer, as it is described in the German published patent application DE 195 48 236 A1. According to this method, the metal ring is brought into contact with the metal layer and pressed to the latter by means of welding electrodes. A welding current flows through the welding electrodes to the metal ring and the metal layer. The welding current heats up certain portions of the metal ring and the metal layer. Within these portions, the metal ring and the metal layer material joins whereby a welding joint between the metal ring and the metal layer is formed.

Practice has shown that in gaskets which have been manufactured according to the described method, the metal ring and the metal layer can become detached which means that the welding joint is not stable. This effect is disadvantageous for the sealing capacity of the gasket.

Therefore, it is an object of the invention to provide a gasket the welding joints of which are stable. Moreover, it is an object of the invention to develop a method for manufacturing such gaskets.

SUMMARY OF THE INVENTION

The object is achieved by a gasket of the type referred to here which is characterized in that the metal layer and the metal ring are welded to each other over a welding bead which keeps the metal layer and the metal ring in a spaced-apart relationship to one another. When before welding the metal ring to the metal layer, the metal ring is brought into contact with the metal layer, the contact between the metal ring and the metal layer is formed along the welding bead (which is throughout this technical teaching called welding bead both before and after the welding process). The contact surface between the apex of the welding bead and an annular region on the metal ring is essentially linear, or one-dimensional, rather than in the form of a two-dimensional contact area. When the metal ring and the metal layer are pressed against each other by means of the welding electrodes, the region between the metal ring and the metal layer over which a welding current flows is much smaller than in case of a two-dimensional contact surface. Accordingly, a much smaller region of the metal ring and the metal layer is heated up so that the local position of the welding joint can be determined more precisely; thus the welding joint is more stable. As a consequence, the welding joint of the gasket is becoming more permanent, and the sealing capacity of the gasket increases.

The distance between the metal ring and the metal layer is selected according to the rigidity of the materials which the cylinder head and the cylinder block, particularly in the areas to be sealed, are made of. The choice is also made according to the form of sealing areas and on further parameters. For materials having a high rigidity, one advantageous embodiment of the gasket is provided in which the distance between the metal ring and the metal layer is constant along the circumference of the metal ring. The distance is generally reciprocal to the rigidity of the material—a small distance for high rigidity materials and a large distance for low rigidity materials—, and is customarily between 5 and 150 (preferably between 10 and 40) micrometers ($\mu$m).

In case the rigidity of the materials the limiting areas are made of, is lower, which is for example the case in light-weight engines, an advantageous embodiment of the gasket is provided where the distance between the metal ring and the metal layer is variable along the circumference of the metal ring. In this case, the gasket preferably has a topography corresponding to the predicted distortions, for example in light-weight cylinder heads.

A preferred embodiment of the gasket provides that the welding bead is plastically, plastically/elastically or elastically compressible along its height extension direction. In this case, once a high external force acts on the gasket, the distance between the metal layer and the metal ring decreases. In particular if an elastic welding bead is given, the elasticity acts against the external force. Thus, the welding bead tends to press the metal ring away from the metal layer which increases the sealing capacity of the gasket. In case the deformation of the welding bead is purely plastic, an advantageous influence on the sealing capacity is likewise achieved due to the spatial adaptation to the topography of the limiting areas.

The metal layer is made of aluminum or sheet steel, preferably stainless steel, spring steel or carbon steel; the metal ring is made of copper, bronze or likewise aluminum, sheet steel, preferably stainless steel, spring steel or carbon steel. Said materials have a certain inherent elasticity. The tendency of the metal layer and the metal ring to act against an external force within the region of the welding bead is increased which likewise has a positive effect on the sealing capacity of the gasket.

It is provided in a preferred embodiment of the gasket that the welding bead runs continuously around the through-hole. A welding bead of this type shows an advantageous sealing behavior especially for combustion gases. Therefore, this embodiment of the gasket is particularly advantageous for through-holes of internal combustion engines where the through-holes are assigned to the combustion chambers of the internal combustion engine, since the combustion gas in the combustion chamber is under a high pressure and any pressure loss involves a performance loss of the internal combustion engine.

Yet a further advantageous embodiment of the gasket provides that the metal layer has at least one sealing bead. The sealing bead which can with respect to its cross section be similar to the welding bead and usually has a height of between 100 and 300 (preferably between 180 and 200) $\mu$m likewise acts against an external force due to its inherent elasticity. Accordingly, it is a further means for increasing the sealing capacity of the gasket.

There are several possibilities for arranging the sealing bead and the metal ring in the metal layer. One of those possibilities is the arrangement of the sealing bead around the metal ring, one further possibility is the arrangement of the metal ring around the sealing bead. Both possibilities are advantageous for through-holes which are assigned to a combustion chamber.

In a further embodiment of the gasket, the welding bead is arranged within the sealing bead. In this embodiment, the sealing bead and the welding bead do not take up separate room on the metal layer. Thus, this embodiment is especially advantageous for small gaskets.

In a further embodiment of the gasket, one further metal ring is arranged around the sealing bead. Thus, one metal ring surrounds the sealing bead on each of its sides. Since each metal ring is welded to the metal layer over a welding bead, this embodiment having one sealing bead and two welding beads comprises three means for increasing the sealing capacity of the gasket.

Different advantageous embodiments are provided in gaskets which have more than one metal layer. As a first embodiment, two adjacent metal layers can be arranged in a way that two sealing beads arranged therein are arranged opposite to each other or offset against each other.

In a second embodiment, the sealing beads can face towards the same or towards different directions. In multi-layer constructions, the sealing bead can likewise be arranged in a metal layer of the gasket which does not have a welding joint to the metal ring.

In yet a further preferred embodiment, at least one of the two metal layers adjacent to the metal ring has an indentation or a cranking for symmetrically aligning the metal layer. Once an external force acts on the gasket of this embodiment, the metal ring enters the indentation or cranking of the metal layer. Thereby, the metal ring is symmetrically aligned.

Moreover, the object is achieved by a method for manufacturing a gasket of the type referred to here, the method being characterized by generating the welding bead in the metal layer and/or metal ring and generating the welding joint between the metal layer and the metal ring by projection welding. Usually, the welding bead is generated by stamping the metal layer. If projection welding is applied, at first the metal layer and the metal ring are brought into contact within the region of the welding bead. In this case, the contact is realized between the apex of the welding bead and a portion of the metal ring. Subsequently, the metal layers and the metal ring are connected to one welding electrode, respectively, such that on the one hand, a welding current can flow from one welding electrode over the metal layer, the welding bead and the metal ring to the other welding electrode, on the other hand, the metal layer and the metal ring can be pressed against each other by means of the welding electrodes. Subsequently, with feeding a low voltage, a high electrical welding current flows from the one welding electrode over the metal layer, the welding bead and the metal ring to the other welding electrode, while at the same time, the two welding electrodes press the metal ring and the metal layer against each other. Due to the electrical resistance of the metal within the region of the welding bead, the welding bead and the metal ring heat up to the welding temperature. The metal the metal ring and the metal layer are made of join whereby the welding joint is generated.

Before the welding process, the welding bead can have cross sections of different forms. U-shaped, V-shaped, $\Omega$-shaped and trapezoidal cross sections have proved to be especially advantageous due to their simple form andproducibility.

One variant of the method according to the invention in which, when generating the welding bead in the metal layer, at least one sealing bead is generated in the metal layer, is especially time-saving since both can be done during one step. In this case, generating the welding beads and the sealing beads in the metal layer can be performed simultaneously or successively.

Additionally, it is provided in a preferred variant of the method that the current necessary for generating the projection welding joint is provided by discharging a capacity. This realization is the easiest possibility of generating a current rush having a high current within a short period of time.

Finally, when generating the welding joint, the flattening of the welding bead and thus the distance between the metal layer and the metal ring can be influenced by at least one deformation limiter within the welding bead or at least one abutment element outside the welding bead. The pressure acting on the metal layer and the metal ring during the welding process due to the welding electrodes involves a flattening of the welding bead. By using the deformation limiter and/or the abutment element according to the invention, this flattening is limited. The height of the deformationlimiter and/or the abutment element to a great extent determines the distance between the metal layer and the metal ring after generating the welding joint.

BRIEF DESCRIPTION OF THE DRAWINGS

Embodiments and examples of the invention will now be described, by way of example only, with reference to the attached drawings in which:

FIGS. 2A and 2B each show schematic side views of an embodiment of a single layer wherein FIG. 2A shows a distance between a metal ring and a metal layer as small and FIG. 2B shows the distance as large.

FIGS. 3 and 4 each show schematic side-views on an embodiment of a single layer gasket;

FIGS. 5 and 6 each show schematic side-views on one further embodiment of a single layer gasket;

FIGS. 7 and 8 each show schematic side-views on an embodiment of a double layer gasket;

FIGS. 10 and 11 each show a schematic side-view on a further embodiment of a triple layer gasket;

DETAILED DESCRIPTION OF THE PREFERRED EMBODIMENTS

Figure 1:
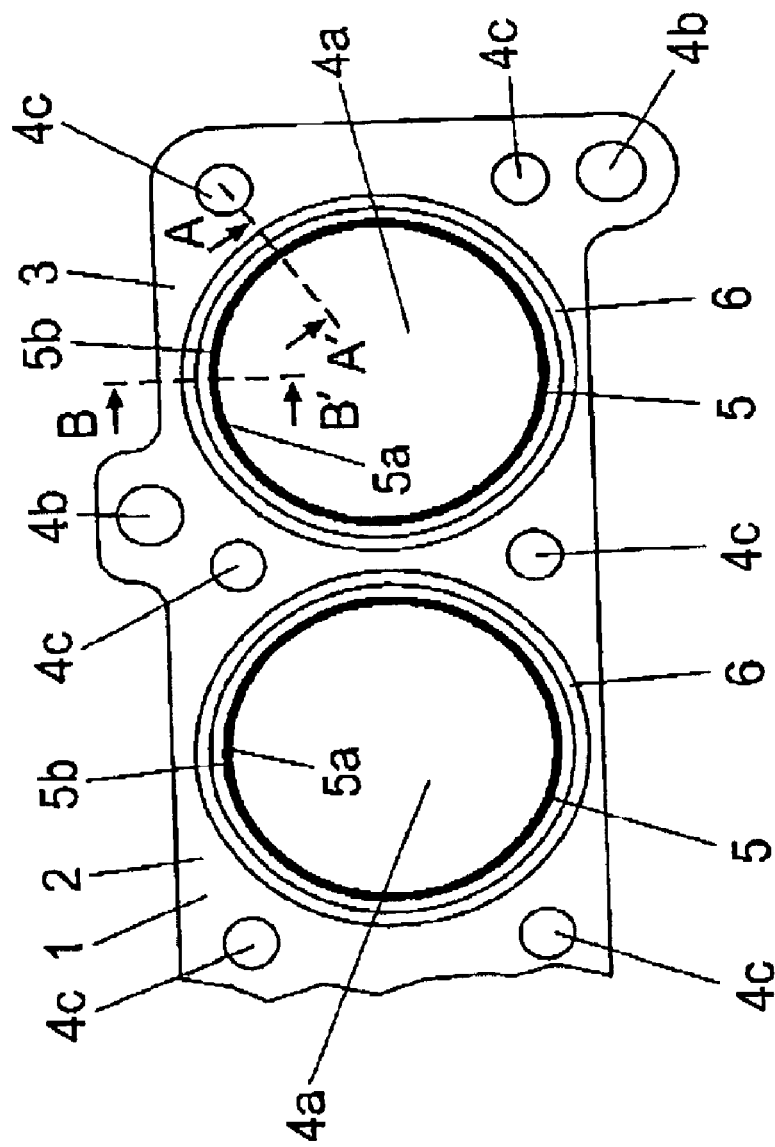
FIG. 1 shows a schematic top-view on an embodiment of a gasket realized as cylinder head gasket.

FIG. 1 shows a metal gasket 1 which is realized as cylinder head gasket 2. The gasket 1 is arranged between a cylinder head (not depicted) and a cylinder block (not depicted either) of an internal combustion engine. The gasket 1 comprises several adjacently arranged metal layers 3. In FIG. 1, only the uppermost metal layer 3 is visible. Each metal layer 3 comprises a plurality of through-holes 4. The metal layers 3 are arranged such that the through-holes 4 lie congruently with respect to each other.

The through-holes 4 are realized as through-holes 4a, 4b and 4c, wherein the through-hole 4a is assigned to the combustion chambers of the internal combustion engine, the through-hole 4b is assigned to the coolant and lubricant passageways of the internal combustion engine, and the through-hole 4c is assigned to the attaching means passageway of the internal combustion engine.

Around each through-hole 4a, a metal ring 5 is arranged. The metal ring 5 has an internal circumference 5a and an external circumference 5b.

The metal layer 3 as well as the metal ring 4 are made of sheet steel. Other materials as for example aluminum for the metal layer and in particular copper or bronze for the metal ring 5 are likewise possible.

In the embodiment of the gasket 1 referred to here, one metal ring 5 is assigned to each through-hole 4a wherein the through-hole 4a and the metal ring 5 are of circular shape, respectively. As an alternative, it is likewise possible to arrange one metal ring 5 around a plurality of through-holes 4, respectively; it is furthermore possible to provide different shapes for the through-hole 4 and the metal ring 5.

Moreover, a sealing bead 6 is arranged around the through-holes 4 and the metal rings 5, respectively. In FIG. 1, the sealing bead 6 and the metal ring 5 extend beyond the drawing plane. The sealing bead 6 has a height of approximately 180 micrometers.

FIGS. 2 to 11 each show a schematic side-view on a portion of the gasket 1. Those figures are limited to depicting the surroundings of a through-hole 4a, the latter being assigned to a combustion chamber. In FIGS. 2 to 11, the through-hole 4a itself is arranged to the right of the edge of the metal layer 3, the cylinder head is arranged above and the cylinder block below the metal layer 3 of the exemplary embodiment of the gasket 1.

Figure 2A:
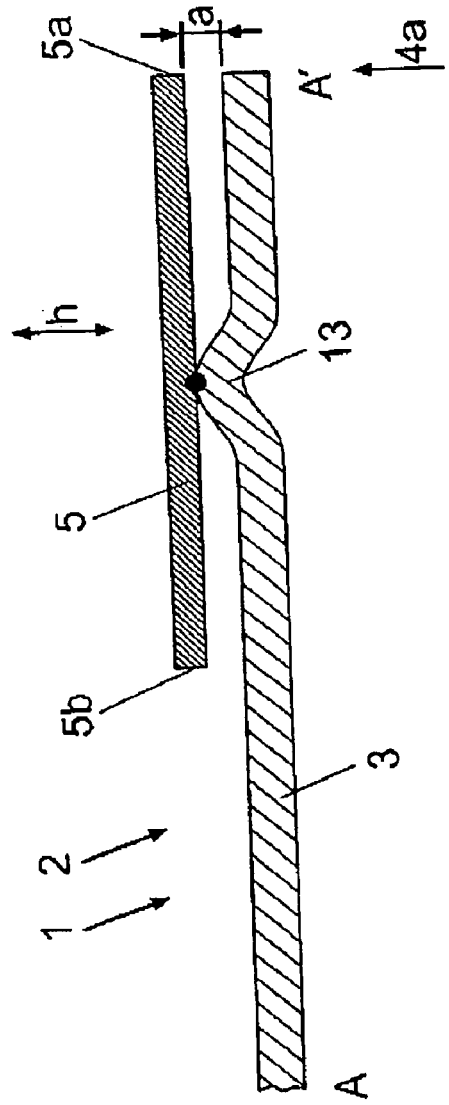
Figure 2B:
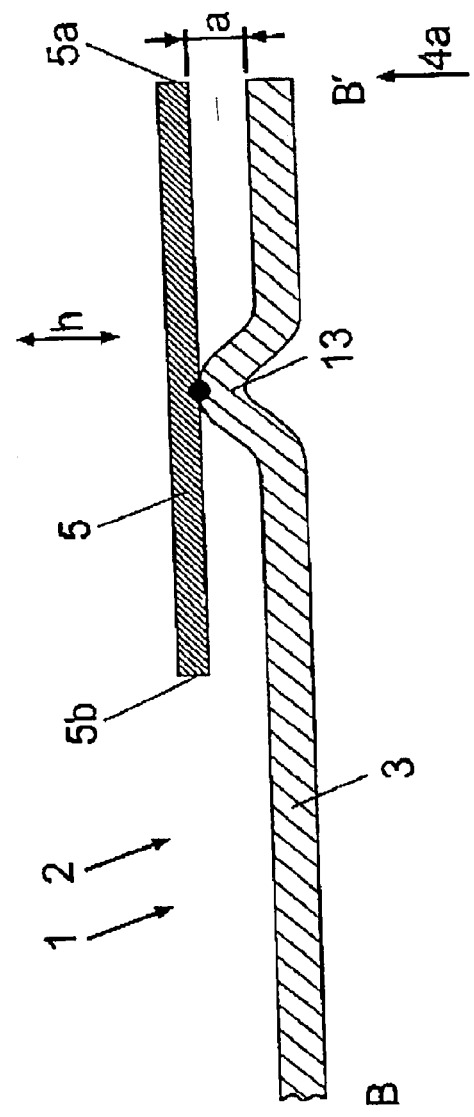

It can be seen in FIG. 2 that the metal ring 5 and the metal layer 3 do not have a two-dimensional contact surface but are kept in a distance a from each other over a welding bead 7. The distance a is approximately 40 micrometers. As long as there is no external force acting on the gasket 1, the distance along the complete through-hole 4a is constant; therefore, the metal ring 5 and the metal layer 3 extend parallel to each other, and the internal circumference 5a and the external circumference 5b of the metal ring 5 both have the same distance a from the metal layer 3.

Along its height extension direction h, the welding bead 7 is elastically compressible. As a consequence of an external force, the distance a between the metal layer 3 and the metal ring 5 decreases. As soon as the external force decreases, the distance a automatically increases again.

Depending on the shape of the areas of the cylinder head and the cylinder block between which the metal layer 3 and the metal ring 5 of the gasket are arranged, as well as depending on the rigidity of the materials the cylinder head and the cylinder block are made of, variable distance values a are likewise possible in the direction of circumference.

FIGS. 3 and 4 each show one embodiment of gasket 1 which is provided with a sealing bead 6. The sealing bead 6 has a cross section which approximately is similar to a compressed inverted U. In both embodiments, the sealing bead 6 is arranged adjacent to the external circumference 5b of the metal ring 5. The sealing bead 6 has a height of approximately 180 micrometers.

The embodiments of the gasket 1 which are depicted in FIGS. 3 and 4 clearly show one aspect of the method according to the invention. The welding bead 7 can be arranged in the metal layer 3 (FIG. 3) as well as in the metal ring 5 (FIG. 4). Whether the welding bead 7 is arranged in the metal layer 3 or in the metal ring 5 depends on which of the components of the gasket 1 has a higher rigidity since the welding bead is usually arranged in the component having the higher rigidity.

As an alternative to the embodiments of FIGS. 3 and 4, it is however likewise possible to provide a welding bead 7 in the metal layer 3 and in the metal ring 5.

FIG. 5 shows a further embodiment of the gasket 1. This embodiment has a second metal ring 5'. The second metal ring 5' is welded to the metal layer 3 over a second welding bead 7'. The internal circumference 5a' is arranged adjacent to the sealing bead 6. The metal ring 5 and the sealing bead 7 on the one hand and the metal ring 5' and the sealing bead 7' on the other hand extend symmetrically with respect to a plane cutting the apex 6a of the sealing bead 6 and extending perpendicularly to the extension plane of the metal layer 3.

In the embodiment of the gasket 1 shown in FIG. 6, the welding bead 7 is arranged in the apex 6a of the sealing bead 6. The sealing bead 6 and the welding bead 7 extend in opposite directions (the sealing bead 6 upwards and the welding bead 7 downwards). The metal ring 5 is welded to the metal layer 3 via the welding bead 7 and extends substantially parallel with respect to the extension plane of the metal layer 3. Accordingly, it is arranged within the sealing bead 6.

FIG. 6 shows particularly clearly that the welding bead 7 has a smaller height than the sealing bead 6. This is true for the majority of embodiments of the gasket 1 which are available in practice.

FIGS. 7 and 8 each show one further embodiment of the gasket 1. The gaskets 1 of FIGS. 7 and 8 each show two metal layers 3 and 3'. The extension planes of the metal layers 3 and 3' extend substantially parallel with respect to each other. The metal layer 3' has a sealing bead 6'. The sealing bead 6 and the sealing bead 6' face towards opposite directions (the sealing bead 6 upwards and the sealing bead 6' downwards). The apex 6a' of the sealing bead 6'and the apex 6a of the sealing bead 6 are sheet-like wherein the apexes 6a and 6a' extend parallel with respect to each other.

With respect to generating welding beads 7, the embodiments of the basket according to FIGS. 7 and 8 correspond to those FIGS. 3 and 4, that is as for the former, the welding bead is arranged in the metal layer 3 whereas as for the latter, the welding bead 7 is arranged in the metal ring 5.

Figure 9:
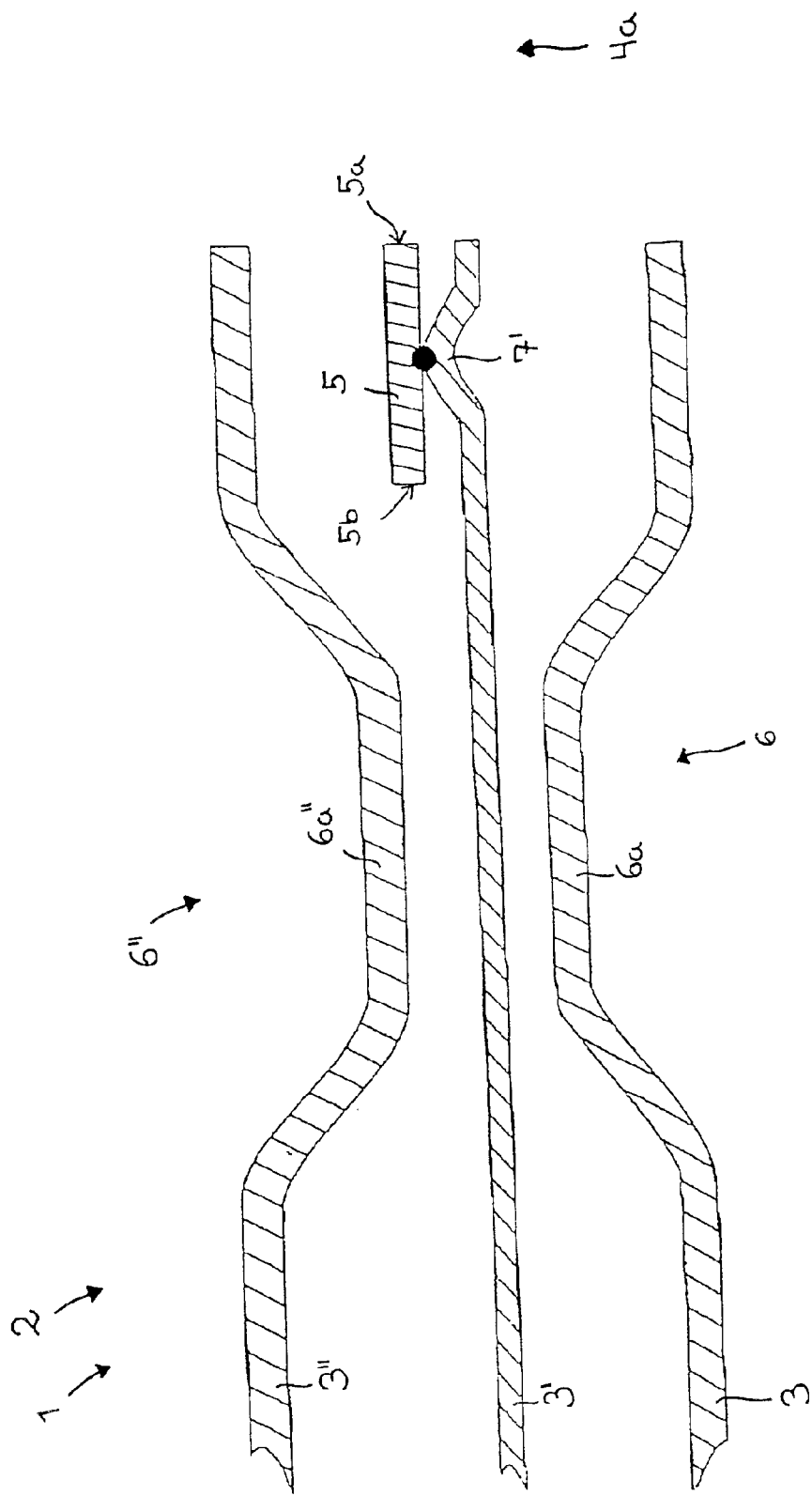
FIG. 9 shows a schematic side-view on an embodiment of a triple layer gasket.

FIG. 9 shows a further embodiment of the gasket 1. This embodiment comprises three metal layers 3, 3', 3". The metal layers 3 and 3" each have sealing beads 6 and 6" which face towards each other. In accordance with the embodiments of FIGS. 7 and 8, the apexes 6a and 6a" of the sealing beads 6 and 6" are sheet-like and extend substantially parallel with respect to each other. The metal layer 3' is arranged between the metal layers 3 and 3" and extends substantially parallel to the latter.

FIG. 10 shows an embodiment of the gasket 1 comprising three metal layers 3, 3', 3". In this embodiment, the welding bead 7 is arranged in the metal layer 3' (in FIG. 10 the upper one). The welding bead 7 faces towards the metal layer 3' (in FIG. 10 the middle one). Via the welding bead 7, the metal ring 5 is welded to the metal layer 3". The metal layer 3' has a cranking 8 which is realized as a cranking edge 8a in the metal layer 3'. The metal layer 3', the cranking 8 is arranged such that in case an external force acts on the metal layer 3" which involves a displacement of the metal ring 5 in the height extension direction h of the welding bead 7, the cranking 8 can receive the metal ring 5. In this case, the external circumference 5b of the metal ring 5 and the cranking edge 8a of cranking 8 are arranged opposite with respect to each other.

FIG. 11 shows one further embodiment of the gasket 1 which substantially corresponds to the one of FIG. 10 except for the cranking 8 of the embodiment of FIG. 10 being replaced with a sealing bead 6' in FIG. 11. The sealing bead 6' faces towards the same direction as the welding bead 7" (downwards in FIG. 11). The apex 6a' of the sealing bead 6a is sheet-like and adjacent to the metal layer 3.

Figure 12:
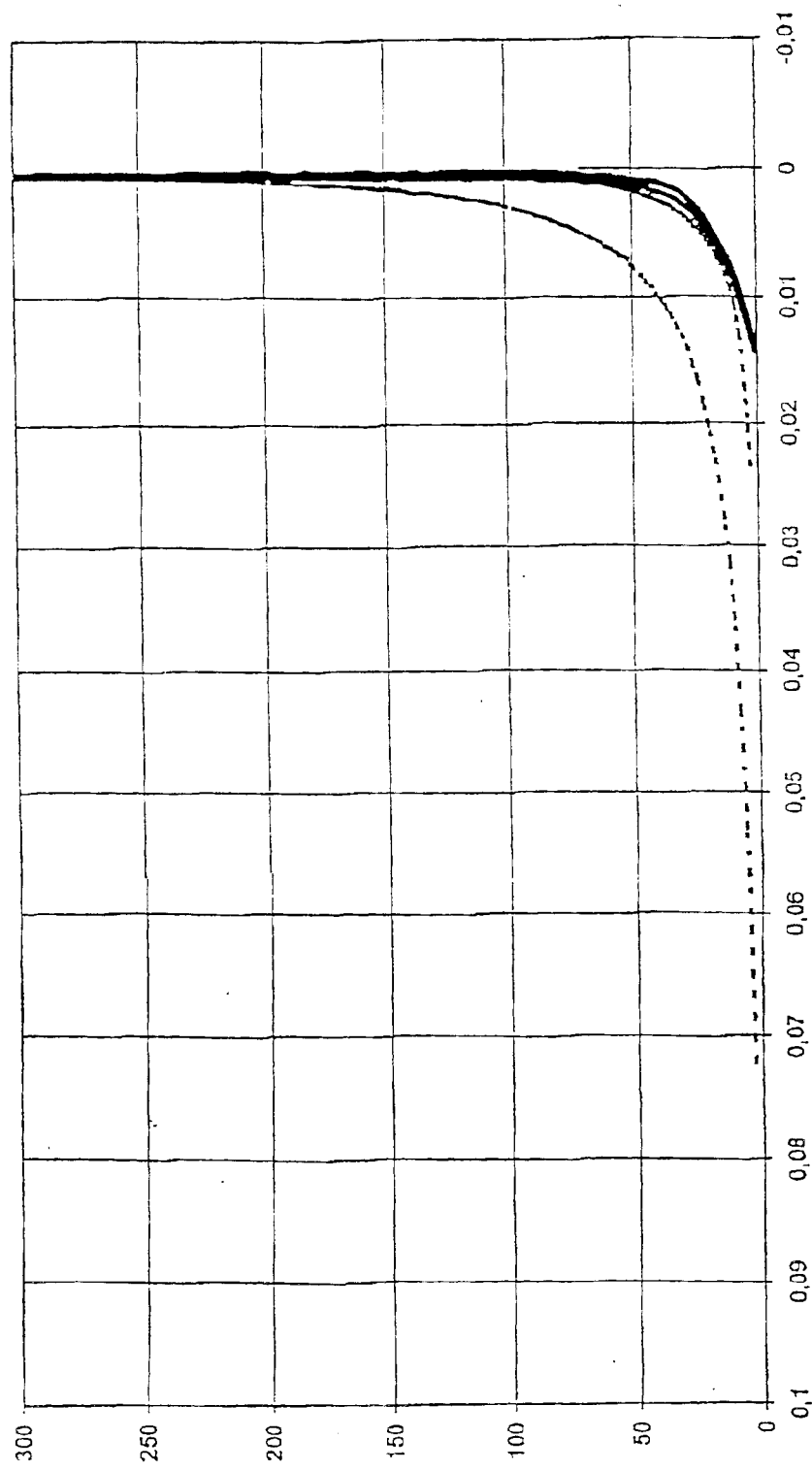
FIG. 12 shows a diagram depicting elastic qualities of the gasket.

FIG. 12 shows a diagram which depicts the elasticity of the gasket 1. The diagram contains a Cartesian Coordinate System the abscissa of which shows the compression (measured in millimeters) and the ordinate of which shows the line-pressure (measured in Newton per millimeter). Two graphs having dashed lines and two graphs having continuous lines are shown in the Cartesian Coordinate System. The graphs having the dashed lines show the line pressure in dependence on the compression of elastic metal rings according to the invention, whereas the graphs having continuous lines show this effect for rigid metal rings.

The diagram clearly shows that with an increasing compression, the line pressure of rigid metal rings occurs later and more intensively as this is the case with elastic metal rings. As a result, the elastic return movement occurs earlier and more intensively with rigid metal rings.

The gasket 1 is manufactured in a method comprising several steps. At first, one or several welding beads 7 and, if necessary, one or several sealing beads 6 are generated in the metal layer 3. The generation of the welding beads 7 and sealing beads 6 is accomplished by stamping. Subsequently, in a first method step, the metal layer 3 and the metal ring 5 are brought into contact with each other in the region of the welding bead 7. Then, in a second method step, the metal layer 3 and the metal ring 5 each are connected to one welding electrode 9 (FIGS. 13 and 14) such that on the one hand, an electric welding current can flow from one welding electrode 9a over the metal ring 5, the welding bead 7 and the metal layer 3 to the other welding electrode 9b and on the other hand, the metal ring 5 and the metal layer 3 can be pressed against each other by means of the welding electrodes 9a and 9b. In a third method step, which is the projection welding as such, a high electric welding current provided by discharging a capacity flows with a low voltage being fed from the welding electrode 9a over the metal ring 5, the welding bead 7 and the metal layer 3 to the other welding electrode 9b, while at the same time, both welding electrodes 9a and 9b press the metal ring 5 and the metal layer 3 against each other. By this pressing, the welding bead 7 is slightly flattened. Due to the electric resistance in the region of the welding bead 7, the welding bead 7 and the metal ring 5 heat up to the welding temperature. The materials of the metal ring 5 and the metal layer 3 join whereby the welding joint between the metal ring 5 and the metal layer 3 is generated.

Figure 13:
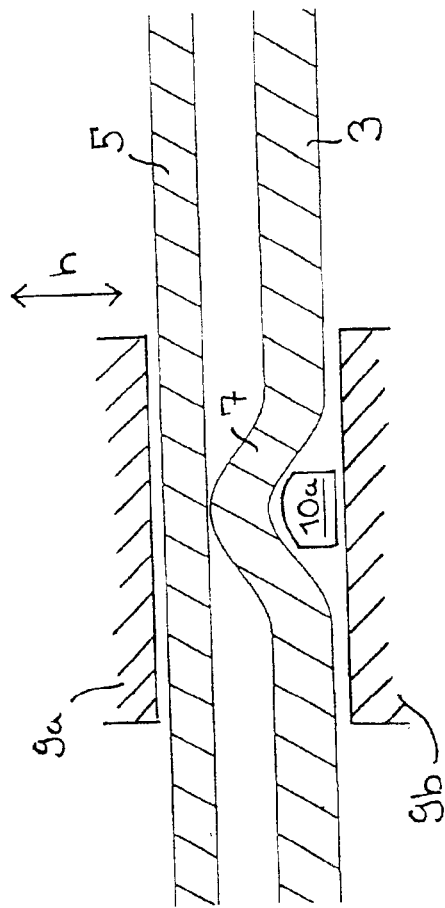
FIGS. 13 and 14 show a variant of the method according to the invention.
Figure 14:
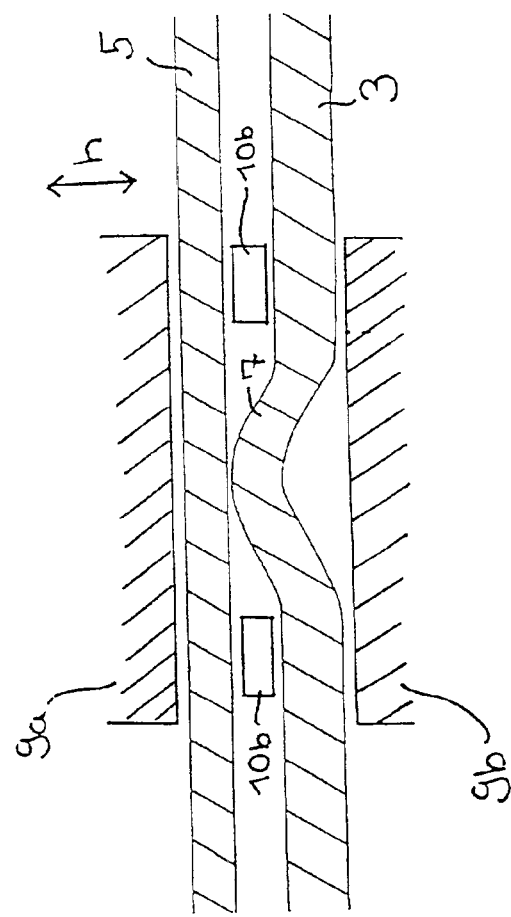

FIGS. 13 and 14 depict a special variant of the projection welding method in which one additional element 10 is used.

In FIG. 13, the additional element 10 is realized as deformation limiter 10a. The deformation limiter 10a has the shape of a torus and a cross section which is similar to a square having a chamfered edge region on one side. The chamfer of the edge region corresponds to the form of the welding bead 7. The deformation limiter 10a is arranged within the welding bead 7 so that the chamfered edge region can be adjacent to the inner surface of the welding bead 7 in a sheet-like manner. In generating the welding joint, the two welding electrodes 9a and 9b are positioned at the welding bead 7 of the gasket 1 such that the deformation limiter 10a is supported by the welding electrode 9b. By a displacement of the welding electrodes 9a and/or 9b along the height extension direction h of the welding bead 7 (the welding electrode 9a downwards and the welding electrode 9b upwards), the metal ring 5 and the metal layer 3 are pressed against each other. This displacement along the height extension direction h is limited by the deformation limiter 10a. By appropriately selecting the height of the deformation limiter 10a, the flattening of the welding bead 7 during the projection welding step can be controlled.

FIG. 14 shows a variant of the method where, instead of the deformation limiter 10a of FIG. 13, two abutment elements 10b are provided. Each abutment element 10b ilorus-like and has a square-shaped cross section. The abutment elements 10b are arranged at both sides of the welding bead 7. The mutual pressing of the metal layers 3 and the metal ring 5 again is realized by a corresponding displacement of the welding electrodes 9a and 9b. According to the embodiment of FIG. 13, the height of the abutment elements 10b limits this displacement. Accordingly, the height of the abutment elements 10b determines the flattening of the welding bead 7.

Gaskets which have been manufactured according to the described method and which have the features listed above have welding joints which are stable for a long time and a high sealing capacity.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A gasket comprising at least one metal layer having at least one through-hole and at least one metal ring welded thereto, said at least one metal ring being arranged around said at least one through-hole, a welding bead, said at least one metal ring being welded to said at least one metal layer over said welding bead, said welding bead maintaining said at least one metal layer and said at least one metal ring in a spaced-apart relationship, said at least one metal layer having a sealing bead, wherein said sealing bead extends around said at least one metal ring, said welding bead having a smaller height than said sealing bead, and wherein said welding bead extends continuously around said at least one through-hole.

2. The gasket according to claim 1, wherein said at least one metal layer and said at least one metal ring are spaced from each other by a distance which is constant around said at least one through-hole.

3. The gasket according to claim 1, wherein said at least one layer and said at least one metal ring are spaced from each other by a distance which varies around said at least one through-hole.

4. The gasket according to claim 1, wherein said welding bead is compressible.

5. The gasket according to claim 1, wherein said at least one metal layer is made of a material selected from the list of aluminum, sheet steel, stainless steel, spring steel and carbon steel.

6. The gasket according to claim 1, wherein said at least one metal ring is made of a material selected from the list of copper, bronze, aluminum, sheet steel, stainless steel, spring steel and carbon steel.

7. The gasket according to claim 1, wherein the gasket comprises two adjacent metal layers having sealing beads located in each metal layer and arranged opposite with respect to each other.

8. The gasket according to claim 1, wherein the gasket comprises two adjacent metal layers having sealing beads located in each metal layer and arranged offset with respect to each other.

9. The gasket according to claim 1, wherein the gasket comprises two metal layers, at least one of which has an indentation or cranking for symmetrically aligning the metal ring.

10. A gasket comprising at least one metal layer having at least one through-hole and at least one metal ring welded thereto, said at least one metal ring being arranged around said at least one through-hole, a welding bead, said at least one metal ring being welded to said at least one metal layer over said welding bead, said welding bead extending continuously around said at least one through-hole, said welding bead maintaining said at least one metal layer and said at least one metal ring in a spaced-apart relationship and said at least one metal layer comprising at least one sealing bead, wherein said sealing bead extends around said at least one metal ring.

11. The gasket according to claim 10, wherein a further metal ring is arranged around the sealing bead.

12. The gasket according to claim 10, wherein said welding bead extends within the sealing bead.

13. A method for manufacturing a gasket having at least one metal layer, and at least one metal ring, said metal layer having at least one through-hole comprising generating a welding bead in one of said metal layer and said metal ring and generating a welding joint between the metal layer and the metal ring by projection welding, said welding bead maintains said at least one metal layer and said at least one metal ring in a spaced-apart relationship, and generating a sealing bead in the at least one metal layer, said welding bead having a smaller height than the sealing bead, wherein said welding bead extends continuously around said at least one through-hole.

14. The method according to claim 13, comprising generating the welding bead with a shape selected from the list of U-shaped, V-shaped, Ω-shaped and trapezoidal cross section.

15. The method according to claim 13, comprising generating the welding bead in the metal layer and generating the sealing bead in the metal layer during the generational of the welding bead in the metal layer.

16. The method according to claim 13, comprising discharging a capacitance to generate a welding current for generating the projection welding joint.

17. The method according to claim 13, comprising at least one deformation limiter within the welding bead during the generation of the welding joint.

18. The method according to claim 13, comprising arranging at least one abutment element outside the welding bead during generation of the welding joint.

19. A gasket comprising at least one metal layer having at least one through-hole and at least one metal ring welded thereto, said at least one metal ring being arranged around said at least one through-hole, a welding bead, said at least one metal ring being welded to said at least one metal layer over said welding bead, said welding bead extending continuously around said at least one through-hole, said welding bead maintaining said at least one metal layer and said at least one metal ring in a spaced-apart relationship and said at least one metal layer comprising at least one sealing bead, wherein said at least one metal ring extends around said sealing bead.

20. A gasket comprising at least one metal layer having at least one through-hole and at least one metal ring welded thereto, said at least one metal ring being arranged around said at least one through-hole, a welding bead, said at least one metal ring being welded to said at least one metal layer over said welding bead, said welding bead extending continuously around said at least one through-hole, said welding bead maintaining said at least one metal layer and said at least one metal ring in a spaced-apart relationship and said at least one metal layer comprising at least one sealing bead, wherein said welding bead extends within the sealing bead.

21. A method for manufacturing a gasket having at least one metal layer, and at least one metal ring, said metal layer having at least one through-hole comprising generating a welding bead in one of said metal layer and said metal ring and generating a welding joint between the metal layer and the metal ring by projection welding, said welding bead maintains said at least one metal layer and said at least one metal ring in a spaced-apart relationship, and generating a sealing bead in the at least one metal layer, wherein said welding bead extends continuously around said at least one through-hole, and arranging at least one deformation limiter within the welding bead during the generation of the welding joint.

22. A method for manufacturing a gasket having at least one metal layer, and at least one metal ring, said metal layer having at least one through-hole comprising generating a welding bead in one of said metal layer and said metal ring and generating a welding joint between the metal layer and the metal ring by projection welding, said welding bead maintains said at least one metal layer and said at least one metal ring in a spaced-apart relationship, and generating a sealing bead in the at least one metal layer, wherein said welding bead extends continuously around said at least one through-hole, and arranging at least one abutment element outside the welding bead during generation of the welding joint.

* * * * *